United States Patent
Hanson

(10) Patent No.: US 8,658,258 B2
(45) Date of Patent: *Feb. 25, 2014

(54) PLASMA TREATMENT OF SUBSTRATES PRIOR TO THE FORMATION A SELF-ASSEMBLED MONOLAYER

(75) Inventor: Eric L. Hanson, Carlsbad, CA (US)

(73) Assignee: Aculon, Inc., San Diego, CA (US)

( * ) Notice: Subject to any disclaimer, the term of this patent is extended or adjusted under 35 U.S.C. 154(b) by 1159 days.

This patent is subject to a terminal disclaimer.

(21) Appl. No.: 12/589,284

(22) Filed: Oct. 21, 2009

(65) Prior Publication Data

US 2010/0098876 A1    Apr. 22, 2010

Related U.S. Application Data

(60) Provisional application No. 61/196,893, filed on Oct. 21, 2008.

(51) Int. Cl.
*B05D 1/00* (2006.01)
*B05D 3/00* (2006.01)
*B05D 3/04* (2006.01)

(52) U.S. Cl.
USPC .......................... 427/535; 427/327; 427/384

(58) Field of Classification Search
USPC ......... 427/535, 327, 372.2, 384, 435; 134/1.1
See application file for complete search history.

(56) References Cited

U.S. PATENT DOCUMENTS

| | | | | |
|---|---|---|---|---|
| 4,252,848 | A | * | 2/1981 | Datta et al. .................. 428/64.2 |
| 4,801,427 | A | | 1/1989 | Jacob .............................. 422/23 |
| 5,600,759 | A | | 2/1997 | Karakama ...................... 395/87 |
| 5,938,854 | A | * | 8/1999 | Roth ................................ 134/1 |
| 6,259,551 | B1 | | 7/2001 | Jacobs ......................... 359/298 |
| 6,835,414 | B2 | | 12/2004 | Ramm ....................... 427/248.1 |
| 6,949,450 | B2 | | 9/2005 | Chiang et al. ................ 438/475 |
| 2003/0228469 | A1 | * | 12/2003 | Boardman et al. ............ 428/421 |
| 2005/0199340 | A1 | | 9/2005 | Selwyn et al. .............. 156/345.1 |
| 2006/0000488 | A1 | | 1/2006 | Claar et al. ..................... 134/1.1 |
| 2007/0092640 | A1 | * | 4/2007 | Bruner et al. ................. 427/157 |
| 2008/0113103 | A1 | | 5/2008 | Claar et al. .................... 427/444 |

OTHER PUBLICATIONS

Suzuki et al., Oxide Film Formation on Metal Surfaces by Atmospheric Pressure RF Barrier Discharge Plasmas, Plasma Processes and Polymers, May 22, 2007, pp. S498-S501.*
Harrik Plasma, Plasma Applications: Plasma Cleaning, http://www.harrickplasma.com/applications_cleaning.php, 2008.*

* cited by examiner

*Primary Examiner* — Jie Yang
*Assistant Examiner* — Timothy Haug
(74) *Attorney, Agent, or Firm* — William J. Uhl

(57) ABSTRACT

An improved method for forming a self-assembled monolayer on a substrate is disclosed. The method comprises plasma treatment of the substrate prior to formation of the self-assembled monolayer.

12 Claims, No Drawings

PLASMA TREATMENT OF SUBSTRATES PRIOR TO THE FORMATION A SELF-ASSEMBLED MONOLAYER

CROSS REFERENCE TO RELATED APPLICATION

The present application claims priority from U.S. Provisional Patent Application Ser. No. 61/196,893, filed Oct. 21, 2008.

FIELD OF THE INVENTION

The present invention relates to a method of forming a self-assembled monolayer on a metal substrate. More particularly, the present invention relates to treating the metal substrate with a plasma prior to the formation of the self-assembled monolayer.

BACKGROUND OF THE INVENTION

It is known in the prior art that organo phosphoric acids form self-assembled monolayers (SAMs) on metallic substrates. The substrates should have on their surfaces some oxide and/or hydroxyl groups. It is believed the acid groups covalently bond to the surface of the metal substrate by reaction with the oxide or hydroxyl groups and the organo groups spontaneously arrange themselves in an ordered array extending in a somewhat perpendicular direction from the substrate with the organo groups being substantially parallel to one another. The resulting film or layer is of a monolayer configuration and, although extremely thin, the SAMs have strong adhesion to the metal substrate because of the covalent bonding; and, because of the well-ordered orientation of the organo groups, the SAMs significantly affect the surface properties of the metal substrates.

However, if the surface of the metal substrate is contaminated such as with processing oils, dust or grit, the ability of the organo phosphorus acids to covalently bond to the metal oxide and/or hydroxyl groups may be compromised and SAMs will not spontaneously form or will form in a discontinuous manner leaving gaps in coverage and poor surface properties. Typically, the metal substrate will be rinsed with an organic solvent to clean the substrate; however, this is insufficient to remove all the surface contaminants and to provide sufficient metal oxide and/or hydroxyl groups so as to provide for the formation of dense SAMs. Also, treatment with caustic solutions tends to etch the protective oxide layer from the surface of the metal and creates a surface that must be further modified to reform the oxide layer.

SUMMARY OF THE INVENTION

The present invention relates to an improved method for applying a self-assembled monolayer on the surface of a substrate comprising:
(a) applying a solution or dispersion of a material in a diluent to the substrate,
(b) removing the diluent, and
(c) forming the self-assembled monolayer derived from the material on the surface of the substrate; the improvement comprising treating the substrate with a plasma prior to step (a).

DETAILED DESCRIPTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "plasma" means an ionized gaseous mixture comprising electrons, positive ions, radicals and neutral species that are generated by creating an electrical discharge in a gaseous atmosphere.

The term "polymer" is also meant to include copolymer and oligomer.

The term "acid" is meant to include substances that donate a proton in a chemical reaction to a base. The term "acid derivative" is meant to include materials that behave similarly to acids such as acid salts, and acid esters, particularly lower alkyl esters containing from 1 to 4 carbon atoms.

The term "solutions" is meant to include homogeneous mixtures of one substance in another. Liquid solutions are optically clear because the particle size of the dissolved material is less than the wavelength of visible light. The term "dispersions" are meant to include non-homogeneous mixtures of one substance in another. Liquid dispersions are translucent and also include emulsions that are optically opaque because the particle size of the dispersed particle is greater than the wavelength of visible light. The dispersed material itself may be of such particle size or it may associate with itself or the dispersing medium forming micelles.

The term "metal" is meant to include metals and metal alloys.

The substrates used in the method of the invention are preferably metal such as metals that have metal oxide groups on their surface that are reactive with groups associated with the material such as acid groups and more particularly acid groups associated with organo groups such as organo phosphorus acids. The acid groups covalently bond to the surface of the metal substrate by reaction with the oxide groups through a dehydration reaction and the organo groups spontaneously arrange themselves in an ordered array extending in a substantially perpendicular direction from the metal substrate with the organo groups being substantially parallel to one another.

Examples of materials which form metal oxide surfaces upon exposure to ambient conditions include iron substrates such as steels, including stainless steels, such as T-201, T-304, T-430, 316 and 17-4 and metals which acquire a non-ablating oxide coating upon exposure to the ambient environment, for example, tantalum, copper, aluminum and their respective alloys such as zinc-aluminum alloy. Examples of other metals include gold, palladium, silver, platinum, nickel, chromium and tungsten including alloys thereof. The metal substrate can also be a composite in which the metal such as steel is coated with a coating of other metals and materials such as tantalum and copper and hard coatings such as chromium, platinum, titanium, chromium oxide, aluminum oxide, etc. See, for example, U.S. Pat. No. 3,754,329.

The substrate is treated with the plasma by placing it in the plasma atmosphere. It is believed the reactive species in the plasma, that is, the electrons, cations and radicals, react with the contaminants, i.e., cutting oils, lubricants, corrosion inhibitors, adhesive products, etc., and remove them as gaseous reaction products (e.g. $CO_2$) while leaving the inorganic component, i.e., metal and metal oxide groups, relatively unscathed.

Any plasma source can be used in the method of the invention; however, plasmas generated at atmospheric pressure (as opposed to vacuum conditions) are preferred because of simplicity of operation.

Any suitable atmospheric plasma source can be employed in the methods of the present invention. Suitable plasma sources include, but are not limited to, the atmospheric-pressure plasma jets described in U.S. Pat. No. 5,961,772 at column 3, line 66 to column 7, line 10, and U.S. Pat. No. 6,262,523 B1 at column 4, line 29 to column 7, line 16; and one atmosphere, uniform glow discharge plasma apparatus described in U.S. Pat. No. 5,414,324 at column 2, line 66 to column 5, line 28.

The plasma is typically generated by an RF electromagnetic field, a DC electromagnetic field, a pulsed DC electromagnetic field, or an arbitrarily generated asymmetric pulsed electromagnetic field. In some cases, the plasma is generated by reactive gases or by intense UV light (e.g. creating oxygen plasma from $O_2/O_3$).

The plasma source can be hand-held during use, or can be used as a static "in-line" plasma source, or the plasma source can be movable by robotic or other mechanical means, for example, in treating a coiled metal substrate on a coil line. Likewise, the method of the present invention can be used on a finished part such as an assembled appliance, and is particularly suitable in treating a substrate having a three-dimensional topography.

The plasma is derived from a feed gas comprising any of a number of gases or combinations thereof. In an embodiment of the present invention, the ionized gas can be derived from a feed gas selected from helium, argon, neon, krypton, oxygen, carbon dioxide, nitrogen, hydrogen, methane, acetylene, propane, ammonia, and/or air. Preferably, the feed gas contains oxygen that is believed to generate metal oxide groups on the metal substrate. Air is an example of a suitable oxygen-containing feed gas.

In the method(s) of the present invention, effective feed gas flow rates can vary widely, for example, feed gas flow rates can range from 1 to 100 standard cubic feet per hour (scfh.), such as from 5 to 75 scfh., or 10 to 50 scfh., or 10 to 35 scfh. The separation distance between the plasma source and the metal substrate surface can vary, and typically ranges between 0.1 to 50 millimeters, such as 0.1 to 35 millimeters, or 0.1 to 25 millimeters, or 1 to 10 millimeters. Likewise, effective power density (power per unit volume) for the plasma can range from 0.1 Watts/cm³, such as from 0.5 to 150 Watts/cm³. Further, it should be understood that dwell time (i.e., residence time of the coated substrate surface in the ionized gas stream) can range widely dependent upon the other method parameters. For example, a dwell time range of 0.01 to 10 seconds had been found to be effective.

It would be understood by skilled artisans that any of the previously mentioned parameters, e.g., separation distance, power density, feed gas flow rates, and dwell times, may vary widely dependent upon what plasma source is employed. For example, an atmospheric glow discharge plasma source typically will generate a plasma that is much more diffuse than that generated by an atmospheric-pressure plasma torch-type plasma source. Hence, the former plasma source is likely to have a power density much lower than that of the latter. Likewise, the atmospheric glow discharge plasma source may require a longer dwell time to effect polymeric coating layer removal than that required using an atmospheric-pressure plasma torch-type plasma source.

By judicious selection of the plasma source and/or related process parameters, such as power, feed gas(es), flow rate of the feed gas(es), temperature, dwell time, and the like, the methods of the present invention are particularly useful for the controlled removal of contaminant on the metal substrate while maintaining or increasing the metal oxide content on the substrate surface.

After the plasma treatment, the substrate is ready for application of a material resulting in the formation of a self-assembled monolayer. Examples of such materials are organo acids such as organo phosphorus acids dispersed or dissolved in a diluent.

Examples of organo phosphorus acids are organo phosphoric acids, organo phosphonic acids and organo phosphinic acids.

Examples of organo phosphoric acids are compounds or a mixture of compounds having the following structure:

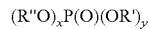

wherein x is 1-2, y is 1-2 and x+y=3, R" is an organic radical preferably containing fluorine and may be monomeric or polymeric. Examples of monomeric radicals are those having a total of 1-30, such as 6-18 carbons, where R' is H, a metal such as an alkali metal, for example, sodium or potassium or lower alkyl having 1 to 4 carbons, such as methyl or ethyl. Preferably, a portion of R' is H. R'" can be aliphatic, aromatic or mixed aliphatic/aromatic. R can be an unsubstituted hydrocarbon or a substituted hydrocarbon.

Example of monomeric phosphonic acids are compounds or mixture of compounds having the formula:

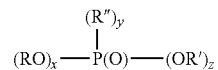

wherein x is 0-1, y is 1, z is 1-2 and x+y+z is 3. R" is organic radical preferably containing fluorine and may be monomeric or polymeric. Examples of monomeric radicals are those having a total of 1-30, such as 6-18 carbons. R' and R are H, a metal, such as an alkali metal, for example, sodium or potassium or lower alkyl having 1-4 carbons such as methyl or ethyl or a base such as an amine. Preferably at least a portion of R' and R is H. R can be aliphatic, aromatic or mixed aliphatic/aromatic. R" can be an unsubstituted hydrocarbon or a substituted hydrocarbon.

Example of monomeric phosphinic acids are compounds or mixture of compounds having the formula:

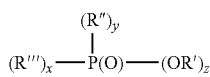

wherein x is 0-2, y is 0-2, z is 1 and x+y+z is 3. Preferably, R and R" are each independently organic radicals preferably containing fluorine and may be monomeric or polymeric. Examples of monomeric radicals are those having a total of 1-30, such as 6-18 carbons. R' is H, a metal, such as an alkali metal, for example, sodium or potassium or lower alkyl having 1-4 carbons, such as methyl or ethyl. Preferably a portion of R' is H. The organic component of the phosphinic acid (R, R") can be aliphatic, aromatic or mixed aliphatic/aromatic. R and R" can be an unsubstituted hydrocarbon or a substituted hydrocarbon.

In addition to the monomeric organo phosphorus acids, oligomeric or polymeric organo phosphorus acids resulting from self-condensation of the respective monomeric acids may be used.

The organo group of the organo acid can be substituted with functional groups, that is, groups that are capable of reacting with other functional groups such as those associated with films or layers of subsequently applied materials. Examples of such functional groups are hydroxyl, phenol, amine, acid such as carboxylic acid, thiol, epoxy, vinyl acrylate, isocyanate, ketene and peroxy.

Preferably, the organo acid is a perfluorinated phosphorus acid. Examples of suitable perfluorinated phosphorus acids are perfluorinated hydrocarbons including oxygen-substituted hydrocarbons that are monomeric or polymeric in nature having an actual or number average molecular weight of 100 to 1,000,000. Such materials are typically represented by the following structure:

$$R_f\text{—}(CH_2)_p\text{—}X \quad (1)$$

where X is a phosphoric, phosphonic or phosphinic group, $R_f$ is a perfluorinated hydrocarbon group including an oxygen-substituted hydrocarbon group, such as a perfluorinated alkyl group or a perfluorinated alkylene ether group and p is 0 to 18, preferably 0 to 4.

Examples of perfluoroalkyl groups are those of the structure:

where Y is F or $C_nF_{2n+1}$; m is 4 to 20 and n is 1 to 6.

Examples of perfluoroalkylene ether groups are those of the structure:

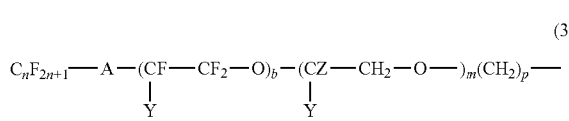

where A is an oxygen radical or a chemical bond; n is 1 to 6; Y is H, F, $C_nH_{2n+1}$ or $C_nF_{2n+1}$; Z is F or H; b is 2 to 20, m is 0 to 6, and p is 0 to 18, preferably 2 to 4 and more preferably 2.

Preferably X is a phosphonic acid group, that is, a group of the structure:

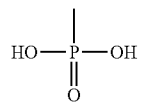

For application to the surface of the substrate, the perfluorinated acid is dissolved or dispersed with the aid of a surfactant in a diluent comprising a mixture of water and an organic solvent.

Suitable surfactants or surface active agents include any of the well-known anionic, cationic or nonionic surfactants. Mixtures of such materials where compatible can be used.

Suitable cationic surfactants include, but are not limited to lauryl pyridinium chloride, cetyldimethyl amine acetate, and alkyldimethylbenzylammonium chloride, in which the alkyl group has from 8 to 18 carbon atoms. Suitable anionic surfactants include, but are not limited to alkali fatty alcohol sulfates, such as sodium lauryl sulfate, and the like; arylalkyl sulfonates, such as potassium isopropylbenzene sulfonate, and the like; alkali alkyl sulfosuccinates, such as sodium octyl sulfosuccinate, and the like; and alkali arylalkylpolyethoxyethanol sulfates or sulfonates, such as sodium octylphenoxypolyethoxyethyl sulfate, having 1 to 5 oxyethylene units, and the like. Suitable non-ionic surfactants include but are not limited to cocamidopropylbetaine, alkyl phenoxypolyethoxy ethanols having alkyl groups of from about 7 to 18 carbon atoms and from about 6 to about 60 oxyethylene units such as, for example, heptyl phenoxypolyethoxy ethanols; ethylene oxide derivatives of long chained carboxylic acids such as lauric acid, myristic acid, palmitic acid, oleic acid, and the like, or mixtures of acids such as those found in tall oil containing from 6 to 60 oxyethylene units; ethylene oxide condensates of long chained alcohols such as octyl, decyl, lauryl, or cetyl alcohols containing from 6 to 60 oxyethylene units; ethylene oxide condensates of long-chain or branched chain amines such as dodecyl amine, hexadecyl amine, and octadecyl amine, containing from 6 to 60 oxyethylene units; and block copolymers of ethylene oxide sections combined with one or more hydrophobic propylene oxide sections.

Preferred surfactants are non-ionic surfactants and more preferably perfluorinated surfactants. Examples of such surfactants are ethylene oxide derivatives of perfluorinated alcohols containing from 6 to 60 oxyethylene units, that is,

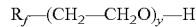

where $R_f$ is a perfluorinated hydrocarbon group and y is equal to 6 to 60.

Examples of suitable perfluorinated hydrocarbon groups are those of the structure:

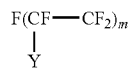

where Y is F or $C_nF_{2n+1}$; m is 4 to 20 and n is 1 to 6.

Such materials are commercially available from E. I. duPont de Nemours and Company as ZONYL FS-300 and ZONYL FSN 100.

The diluent for the composition is a mixture of an organic solvent and water. Examples of organic solvents are polar organic solvents, for example, alcohols such as methanol and ethanol, ketones such as methyl ethyl ketone, ethers such as tetrahydrofuran, and esters such as ethyl acetate. Preferred polar organic solvents are glycol ethers. Examples of glycol ethers are mono and dialkylethers of ethylene glycol and propylene glycol and oxyalkylated derivatives thereof such as diethylene glycol and dipropylene glycol and in which the alkyl group typically contains from 1 to 6, preferably 1 to 4 carbon atoms. Specific examples of glycol ethers are the monobutyl ether of ethylene glycol and the dibutyl ether of diethylene glycol and the mono n-propyl ether of propylene glycol.

The components of the composition are typically present in admixture with one another in the following ranges:
- 0.1 to 10, preferably 0.5 to 2 percent by weight of the perfluorinated acid,
- 0.1 to 10, preferably 0.5 to 2 percent by weight of the surfactant,
- 2.0 to 30, preferably 5 to 15 percent by weight of the organic solvent, and
- 50 to 95, preferably 75 to 94 percent by weight of water.

To prepare the compositions of the invention, the perfluorinated acid, surfactant and organic solvent are typically premixed with vigorous agitation and then added to the water with high shear mixing. Depending on the selection of the components and their relative amounts, the composition can be in the form of a dispersion or a solution. Particle size ranges from 1 nanometer to 5 microns. More typically the particle size ranges from 5 to 500 nanometers.

The compositions prepared as described above can be applied to the metal substrate by immersion of the substrate in the composition, spraying the composition on the substrate or applying the composition to a carrier such as a roller or felt pad and then wiping the substrate with the carrier.

Preferably the composition is applied to the substrate with heating. For example, the composition or substrate can be preheated before application, or the composition can be applied to the substrate and the coated substrate heated in inductive or IR heating. Heating, although helpful in the formation of the self-assembled film as described below, does not have to be high. Temperatures on the order of 50 to 70° C. are typical although higher temperatures up to 300° C. can be used with metal substrates.

After application of the composition to the metal substrate, the diluent is removed, typically by evaporation, and a thin film of about 0.5 to 100 nanometers is formed. The resulting layer is hydrophobic having a water contact angle greater than 70°, typically from 75 to 130°. The water contact angle can be determined using a contact angle goniometer. The perfluorinated phosphorus acid forms a self-assembled layer, which for the most part is a monolayer on the surface of the metal substrate. The self-assembled film is formed by the chemisorption and spontaneous organization of the perfluorinated phosphorus acid on the substrate surface. The perfluorinated phosphorus acids are ampliphilic molecules that have two functional groups. The first functional group is the head group, that is, the acid group that attaches by a covalent bonding to the oxides and optionally to the hydroxyl groups present on the substrate surface. The second functional group is the perfluoro group, the tail group, is covalently bonded to the first functional group and extends outwardly in a substantially perpendicular direction from the substrate and in which the perfluorinated groups are substantially parallel to one another.

Optionally, a subsequent layer of a different material may be formed over the self-assembled monolayer. Examples of different materials would be a polytetrafluoroethylene coating or a polysiloxane coating.

The organo acid can be applied directly to the plasma-treated substrate or can be applied indirectly to the plasma-treated substrate through an intermediate organometallic coating. When better adhesion and durability is desired, an organometallic coating may be applied to the plasma-treated substrate, particularly a metal substrate, followed by application of the organo acid.

The organometallic compound is preferably derived from a metal or metalloid, preferably a transition metal, selected from Group III and Groups IIIB, IVB, VB and VIB of the Periodic Table. Transition metals are preferred, such as those selected from Groups IIIB, IVB, VB and VIB of the Periodic Table. Examples are tantalum, titanium, zirconium, lanthanum, hafnium and tungsten. The organo portion of the organometallic compound is selected from those groups that are reactive with functional groups, such as acid groups (or their derivatives) of the organo phosphorus compound. Also, as will be described later, the organo group of the organometallic compound is believed to be reactive with groups on the substrate surfaces being treated such as oxide and hydroxyl groups. Examples of suitable organo groups of the organometallic compound are alkoxide groups containing from 1 to 18, preferably 2 to 4 carbon atoms, such as ethoxide, propoxide, isopropoxide, butoxide, isobutoxide, tert-butoxide and ethylhexyloxide. Mixed groups such as alkoxide, acetyl acetonate and chloride groups can be used.

The organometallic compounds can be in the form of simple alkoxylates or polymeric forms of the alkoxylate, and various chelates and complexes. For example, in the case of titanium and zirconium, the organometallic compound can include:

a. alkoxylates of titanium and zirconium having the general formula $M(OR)_4$, wherein M is selected from Ti and Zr and R is $C_{1-18}$ alkyl, b. polymeric alkyl titanates and zirconates obtainable by condensation of the alkoxylates of (a), i.e., partially hydrolyzed alkoxylates of the general formula $RO[-M(OR)_2 O-]_{x-1}R$, wherein M and R are as above and x is a positive integer, c. titanium chelates, derived from ortho titanic acid and polyfunctional alcohols containing one or more additional hydroxyl, halo, keto, carboxyl or amino groups capable of donating electrons to titanium. Examples of these chelates are those having the general formula $$Ti(O)_a(OH)_b(OR')_c(XY)_d$$

wherein a=4-b-c-d; b=4-a-c-d; c=4-a-b-d; d=4-a-b-c; R' is H, R as above or X—Y, wherein X is an electron donating group such as oxygen or nitrogen and Y is an aliphatic radical having a two or three carbon atom chain such as i. —$CH_2CH_2$—, e.g., of ethanolamine, diethanolamine and triethanolamine,

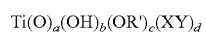

ii. e.g., of lactic acid,

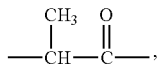

iii. e.g., of acetylacetone enol form, and

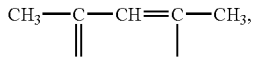

iv. e.g., as in 1,3-octyleneglycol, d. titanium acylates having the general formula $Ti(OC-OR)_{4-n}(OR)_n$ wherein R is $C_{1-18}$ alkyl as above and n is an integer of from 1 to 3, and polymeric forms thereof, e. mixtures thereof.

The organometallic compound is usually dissolved or dispersed in a diluent. Examples of suitable diluents are alcohols such as methanol, ethanol and propanol, aliphatic hydrocarbons, such as hexane, isooctane and decane, ethers, for example, tetrahydrofuran and dialkyl ethers such as diethyl ether. Alternatively, the organometallic compound can be applied by vapor deposition techniques.

Also, adjuvant materials may be present with the organometallic compound and the diluent (organometallic compositions). Examples include stabilizers such as sterically hindered alcohols, surfactants and anti-static agents. The adjuvants if present are present in amounts of up to 30 percent by weight based on the non-volatile content of the composition.

The concentration of the organometallic compound in the composition is not particularly critical but is usually at least 0.01 millimolar, typically from 0.01 to 100 millimolar, and more typically from 0.1 to 50 millimolar.

The organometallic treating composition can be obtained by mixing all of the components at the same time or by combining the ingredients in several steps. Since the organometallic compound is reactive with moisture, care should be taken that moisture is not introduced with the diluent or adjuvant materials and that mixing is conducted in a substantially anhydrous atmosphere.

The organometallic composition can be applied to the substrate surface by conventional means such as immersion coating such as dipping, rolling, spraying or wiping to form a film. The diluent is permitted to evaporate. This can be accomplished by heating to 50-200° C. or by simple exposure to ambient temperature, that is, from 20-25° C. It is believed that the resulting film is in the form of a polymeric metal oxide in multilayer form with unreacted alkoxide and hydroxyl groups. This is accomplished by depositing the film under conditions resulting in hydrolysis and self-condensation of the alkoxide. These reactions result in a polymeric coating being formed that provides cohesive strength to the film. The conditions necessary for these reactions to occur is to deposit the film in the presence of water, such as a moisture-containing atmosphere, however, these reactions can be performed in solution by the careful addition of water. The resulting film has some unreacted alkoxide groups and/or hydroxyl groups for subsequent reaction and covalent bonding with the organo phosphorus over layer material. However, for readily co-reactive groups, ambient temperatures, that is, 20° C., may be sufficient. Although not intending to be bound by any theory, it is believed the polymeric metal oxide is of the structure:

where M is the metal of the invention, R is an alkyl group containing from 1 to 30 carbon atoms; $x+y+z=V$, the valence of M; x is at least 1, y is at least 1, z is at least 1; $x=V-y-z$; $y=V-x-z$; $z=V-x-y$; n is greater than 2, such as 2 to 1000.

The resulting film typically has a thickness of 0.5 to 100 nanometers. For other applications, thicker films can be used. When the organometallic compound is used neat and applied by chemical vapor deposition techniques in the absence of moisture, a thin metal alkoxide film is believed to form. Polymerization, if any occurs, is minimized and the film may be in monolayer configuration. When the organometallic compound is subjected to hydrolysis and self-condensation conditions as mentioned above, thicker films are formed.

Although not intending to be bound by any theory, it is believed the acid groups of the organo acid covalently bond with the hydroxyl or alkoxide group of the organometallic coating, resulting in a durable film. It is believed that the organo acid forms a self-assembled monolayer on the surface of the substrate as generally described above.

EXAMPLES

Example 1

A 1% dispersion of the perfluorinated phosphonic acid ("PFPA") having the following structure:

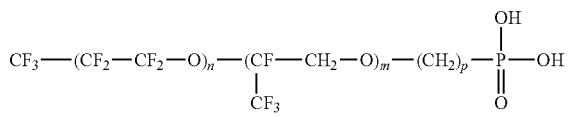

where n is equal to 1 to 14, m is equal to 1, and p is equal to 3, was prepared by mixing 10 grams (g) of the PFPA with 10 g of the perfluorinated surfactant ZONYL FS-100, 100 g of the mono n-propyl ether of propylene glycol (DOWANOL PnP) and 880 g of distilled water. The first three ingredients were premixed with vigorous agitation and added to the deionized water with high shear mixing for 10 minutes resulting in a hazy dispersion.

A 3"×5" piece of #4 brushed stainless steel (430 alloy, Main Steel) was coated using the above-described formulation using the following process. The removal of contaminants (PSA residues, milling and cutting oils left from processing) was attained by treating the surface with oxygen plasma and ozone using a UV-Ozone Photoreactor from UVP. The stainless steel sample was placed on the sample stage and raised to approximately 1" from the Hg lamp, then the door closed and the lamp was operated for 10 minutes. Before plasma treatment, the stainless steel coupon had a water contact angle of 60 degrees and was not water break free, indicating a contaminated surface. After plasma treatment, the water contact angle was less than 5 degrees and the surface was water break free, indicating a very clean surface. Alternatively, the surface can be cleaned of contaminants using other plasma sources such as RF or corona discharge. The plasma may be generated in vacuum or atmospheric conditions.

The plasma-treated substrate was coated by buffing the surface with an F1 felt pad saturated with the dispersion at a temperature of 60° C. for 10 seconds to deposit a self-assembled monolayer. Excess coating was rinsed off with water and blown dry with compressed air. The performance of the coated substrate was then evaluated by water contact angle and stain repellency tests as reported in the table below.

Example 2 (Comparative)

The procedure of Example 1 was repeated with the exception that the metal substrate was cleaned by rubbing the surface of the substrate with a felt pad saturated with acetone. After acetone cleaning, the stainless steel coupon had a water contact angle of 70 degrees and was not water break free, indicating that the acetone did not remove all of the surface contaminants. The PFPA was applied to the treated substrate and the coated substrate was then evaluated by water contact angle and stain repellency tests as reported in the table below.

Water contact angle (WCA): A drop of water (approx 10 uL) is placed onto the surface, and the interior angle of contact between the water droplet and the surface is measured as in U.S. Pat. No. 5,268,733 using a Tantec CAM MICRO (Tantec). Materials with low surface energies will typically have high water contact angles; stain repellant coatings typically have water contact angles of greater than 105 degrees.

Stain repellency: In this test, the ability of the surface to repel organic matter is approximated. An X mark is drawn across the panel surface using a black fine point Sharpie marker and the ink is allowed to dry for five minutes. Then using a clean lint-free tissue, the surface is rubbed in a back and forth manner using a 300 g/cm² force ten times. The amount of ink removed is judged on a 0-5 scale, with 5 being the highest performance (all visible ink removed) and 0 being the lowest (no ink removed).

Coating durability: In this test, the resistance to removal of the coating by household cleaners is approximated. Four layers of paper towel (Bounty$^{(R)}$) are wrapped around a universal abrading head which is secured at the end of the spline shaft of a Taber Linear abraser. The paper towel is then saturated with Windex Multipurpose antibacterial cleaner (S.C. Johnson) then wiped across the sample surface with an applied pressure of 250 g/cm². After 500 back and forth cycles, the sample is cleaned with soap and water then rinsed with fresh water and blown dry with oil-free compressed air. Then the coating performance is evaluated by measuring the water contact angle.

Example 3 (Comparative)

The procedure of Example 1 was repeated with the exception that the metal substrate was cleaned by first immersing the sample in a bath of 3% (w/w) potassium hydroxide 3% (w/w) 2-butoxyethanol, 0.5% (w/w) tetrasodium EDTA and 93.5% (w/w) water at 60° C. and ultrasonicating for 30 seconds. The substrate was then rinsed with distilled water and blown dry. The water contact angle was measured to be <10 degrees and the surface was water break free, indicating a clean surface. The surface was then coated with the PFPA composition as in Example 1.

| Example | WCA | Stain Repellency | WCA after Abrasion |
|---|---|---|---|
| Control Blank 430 SS | 60 | 0 | 35 |
| 1 | 118 | 5 | 116 |
| 2 | 116 | 4 | 100 |
| 3 | 114 | 4 | 104 |

What is claimed is:

1. A method for cleaning the surface of a metal substrate having metal oxide groups on the surface, comprising:
   (a) treating the surface of the metal substrate with a plasma generated from a gas containing oxygen so as to generate metal oxide groups on the surface of the metal substrate and to remove contaminants from the surface of the metal substrate as gaseous reaction products,
   (b) applying a solution or dispersion of a perfluorinated organo phosphorus acid of the structure:

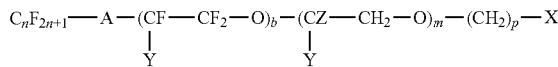

where A is an oxygen radical or a chemical bond; n is 1 to 6; Y is H, F, $C_nF_{2n+1}$ or $C_nH_{2n+1}$; Z is H or F; b is 2 to 20; m is 0 to 6; p is 2 to 4; and X is a group selected from the group consisting of phosphoric acid, phosphinic acid and phosphonic acid, in a diluent to the surface of the metal substrate treated in step (a),
   (c) removing the diluent, and
   (d) forming a self-assembled organo phosphorus monolayer with the acid groups of the perfluorinated organo phosphorus acid covalently bonded to the metal surface by reaction with the oxide groups.

2. The method of claim 1 in which the plasma is generated at atmospheric pressure.

3. The method of claim 1 in which the plasma is created with radio frequency (Rf) energy.

4. The method of claim 1 in which the plasma is generated from air.

5. The method of claim 1 in which the solution or dispersion is heated to 30-200° C. prior to application to the substrate.

6. The method of claim 1 in which a subsequent coating is applied after formation of the self-assembled monolayer.

7. The method of claim 6 in which the subsequent coating contains perfluorinated polymer.

8. The method of claim 1 in which the substrate is a metal selected from iron or an iron alloy substrate.

9. The method of claim 8 in which the iron substrate is stainless steel.

10. The method of claim 1 in which the substrate is a metal selected from the group consisting of copper, aluminum, gold, palladium, silver, platinum, nickel, chromium, or tungsten and their alloys.

11. The method of claim 10 in which the metal substrate is aluminum or an aluminum alloy.

12. The method of claim 11 in which the metal substrate is a zinc-aluminum alloy.

* * * * *